(12) United States Patent
Nishimura et al.

(10) Patent No.: US 8,655,226 B2
(45) Date of Patent: *Feb. 18, 2014

(54) OPENING AND CLOSING APPARATUS (75) Inventors: Yoichiro Nishimura, Nagoya (JP); Kumiko Kuriki, Nagoya (JP); Yukio Shiohara, Nagoya (JP); Kazuhito Ishida, Ichinomiya (JP); Masahisa Kato, Nagoya (JP); Tomohisa Higuchi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 382 days.

This patent is subject to a terminal disclaimer.

(21) Appl. No.: 13/072,721

(22) Filed: Mar. 27, 2011

(65) Prior Publication Data
US 2011/0240668 A1 Oct. 6, 2011

(30) Foreign Application Priority Data
Mar. 30, 2010 (JP) ................................ 2010-079433

(51) Int. Cl.
G03G 15/00 (2006.01)
G03G 21/16 (2006.01)

(52) U.S. Cl.
CPC .................................. *G03G 21/1628* (2013.01)
USPC ....................................................... 399/125

(58) Field of Classification Search
CPC .................. G03G 21/1628; G03G 2221/1687; B65F 1/1623; B65F 1/1646
USPC ............................ 399/125; 220/815, 811, 812
See application file for complete search history.

(56) References Cited

U.S. PATENT DOCUMENTS

| | | | |
|---|---|---|---|
| 3,841,466 A | 10/1974 | Hoffman et al. | |
| 4,816,921 A | 3/1989 | Akiyama et al. | |
| 5,205,073 A | 4/1993 | Lyons, Sr. | |
| 7,804,628 B2 * | 9/2010 | Hashimoto et al. | 358/494 |

(Continued)

FOREIGN PATENT DOCUMENTS

| | | |
|---|---|---|
| EP | 0199454 A2 | 10/1986 |
| FR | 2734308 A1 | 11/1996 |

(Continued)

OTHER PUBLICATIONS

European Patent Office, extended European Search Report for European Patent Application No. 11159633.4 (counterpart European patent application), dated Feb. 11, 2013.

(Continued)

*Primary Examiner* — Walter L Lindsay, Jr.
*Assistant Examiner* — Rodney Bonnette
(74) *Attorney, Agent, or Firm* — Baker Botts L.L.P.

(57) ABSTRACT

The opening and closing apparatus includes a lower unit case, an upper unit case, a hinge, a lower guide member, an upper guide member and an opening/closing linking unit. The upper unit case is configured to open and close with respect to the lower unit case. The lower guide member is disposed in the lower unit case, and the upper guide member is disposed in the upper unit case. The opening/closing linking unit includes a first rotating member, a second rotating member and a linking portion. As the upper unit case is closed, the opening/closing linking unit moves from the base end side toward the distal end side along the upper guide member and the lower guide member.

13 Claims, 8 Drawing Sheets

(56) References Cited

U.S. PATENT DOCUMENTS

| | | | |
|---|---|---|---|
| 2006/0029424 | A1 | 2/2006 | Kawai et al. |
| 2007/0119548 | A1* | 5/2007 | Anderson .................... 160/211 |
| 2008/0237252 | A1* | 10/2008 | Elefante ....................... 220/811 |
| 2010/0040394 | A1 | 2/2010 | Iijima |
| 2011/0241511 | A1 | 10/2011 | Nishimura et al. |
| 2011/0243608 | A1 | 10/2011 | Nishimura et al. |

FOREIGN PATENT DOCUMENTS

| | | | |
|---|---|---|---|
| JP | H01-029815 | Y2 | 9/1989 |
| JP | H04-052783 | A | 2/1992 |
| JP | H05-019543 | A | 1/1993 |
| JP | H05-333610 | A | 12/1993 |
| JP | H06-167841 | A | 6/1994 |
| JP | H08-054810 | A | 2/1996 |
| JP | H11-038714 | A | 2/1999 |
| JP | 2000-159251 | A | 6/2000 |
| JP | 2005-297278 | A | 10/2005 |
| JP | 2006-044061 | A | 2/2006 |
| JP | 2007-336451 | A | 12/2007 |
| JP | 2010-045736 | A | 2/2010 |

OTHER PUBLICATIONS

European Patent Office, extended European Search Report for European Patent Application No. 11159634.2 (counterpart European patent application), dated Feb. 8, 2013.
Japan Patent Office, Decision to Grant a Patent for Japanese Patent Application No. 2010-080663 (counterpart to above-captioned patent application), mailed Apr. 25, 2012.
United States Patent and Trademark Office, Non Final Rejection for U.S. Appl. No. 13/072,739 (related to above-captioned patent application), mailed Jun. 13, 2013.
United States Patent and Trademark Office, Notice of Allowance for U.S. Appl. No. 13/072,725 (related to above-captioned patent application), mailed Jun. 19, 2013.
State Intellectual Property Office of the People's Republic of China, Notification of First Office Action for Chinese Patent Application No. 201110083718.8 (counterpart to above-captioned patent application), mailed on May 31, 2013.

* cited by examiner

OPENING AND CLOSING APPARATUS

CROSS REFERENCE TO RELATED APPLICATION

The present application claims priority from Japanese Patent Application No. 2010-079433, which was filed on Mar. 30, 2010, the disclosure of which is incorporated herein by reference in its entirety.

BACKGROUND

1. Field of the Invention

The present invention relates to an opening and closing apparatus, particularly an upper unit case opening and closing apparatus, in which an upper unit case is opened and closed with respect to a lower unit case.

2. Description of the Related Art

An upper unit case opening and closing apparatus, in which an upper unit case is connected to a lower unit case via a gas spring, and a coil spring is attached to an inner surface of the upper unit case, is known. In the upper unit case opening and closing apparatus, when the upper unit case is closed, an end of the coil spring is supported on the lower unit case and the upper unit case is prevented from closing suddenly toward the lower unit case.

In the upper unit case opening and closing apparatus, a large number of components and large-sized components such as a gas spring are needed. Thus, a configuration of the apparatus may be more complicated and a size of the apparatus may be larger.

SUMMARY

A need has arisen to provide an opening and closing apparatus in which the components can be simplified and downsized.

According to an embodiment of the present invention, the opening and closing apparatus includes a lower unit case, an upper unit case, a hinge, a lower guide member, an upper guide member and an opening/closing linking unit. The upper unit case is disposed above the lower unit case and is configured to open and close with respect to the lower unit case. The hinge is configured to connect the upper unit case to the lower unit case such that the upper unit case pivots with respect to the lower unit case. The lower guide member is disposed in the lower unit case and extends from a base end side toward a distal end side of the lower unit case. The upper guide member is disposed in the upper unit case and extends from a base end side toward a distal end side of the upper unit case. The opening/closing linking unit includes a first rotating member, a second rotating member and a linking portion. The linking portion is configured to link the first rotating member and the second rotating member. As the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member.

BRIEF DESCRIPTION OF THE DRAWINGS

FIGS. 7A and 7B illustrate a second embodiment where a lower guide member has an upwardly convex shape and an upper guide member has a linear shape and horizontal orientation, in which

DESCRIPTION OF THE PREFERRED EMBODIMENTS

A first embodiment of the present invention will be described with reference to FIGS. 1 to 4.

Figure 1A:
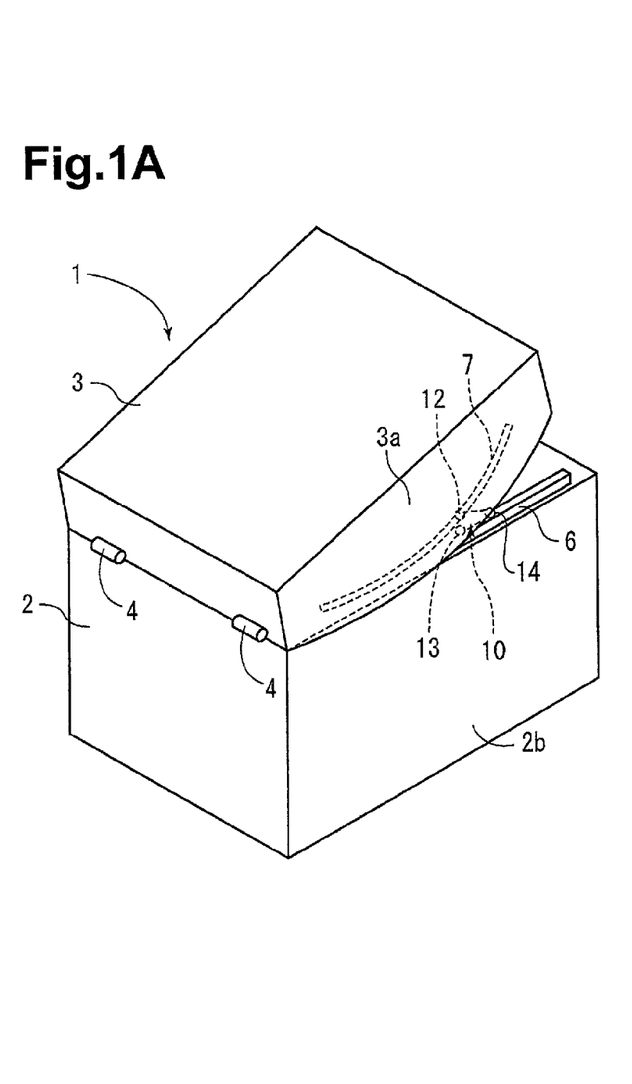
FIG. 1A is a perspective view illustrating a state of an intermediate stage in opening an upper unit case with respect to a lower unit case of a first embodiment.
Figure 1B:
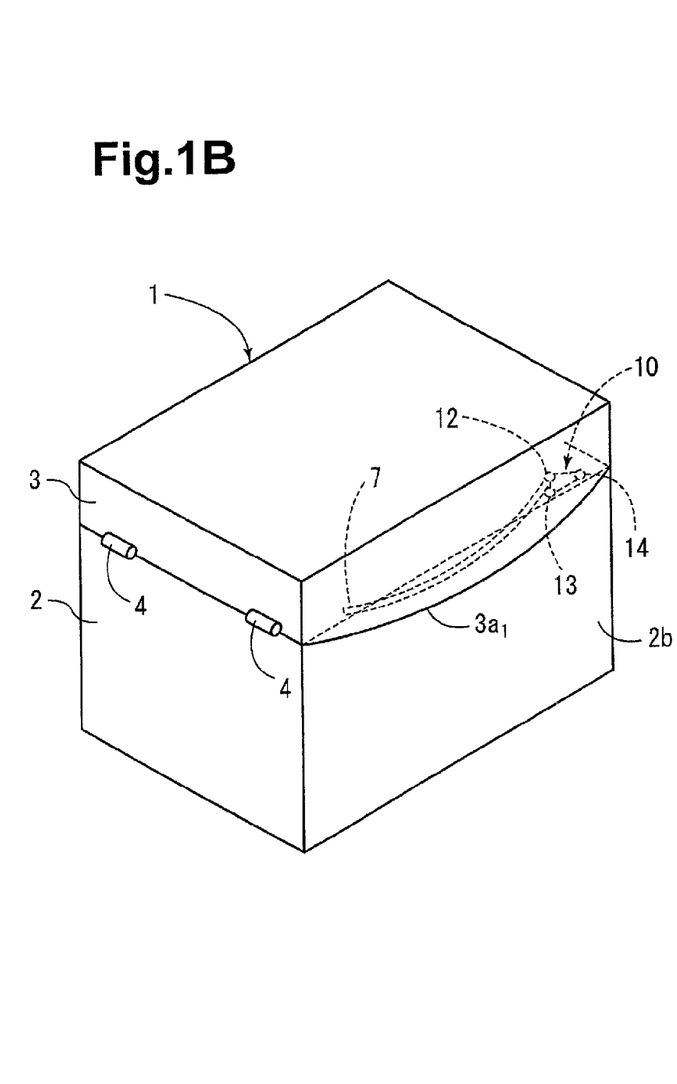
FIG. 1B is a perspective view illustrating a state in which the upper unit case is closed.
Figure 2A:
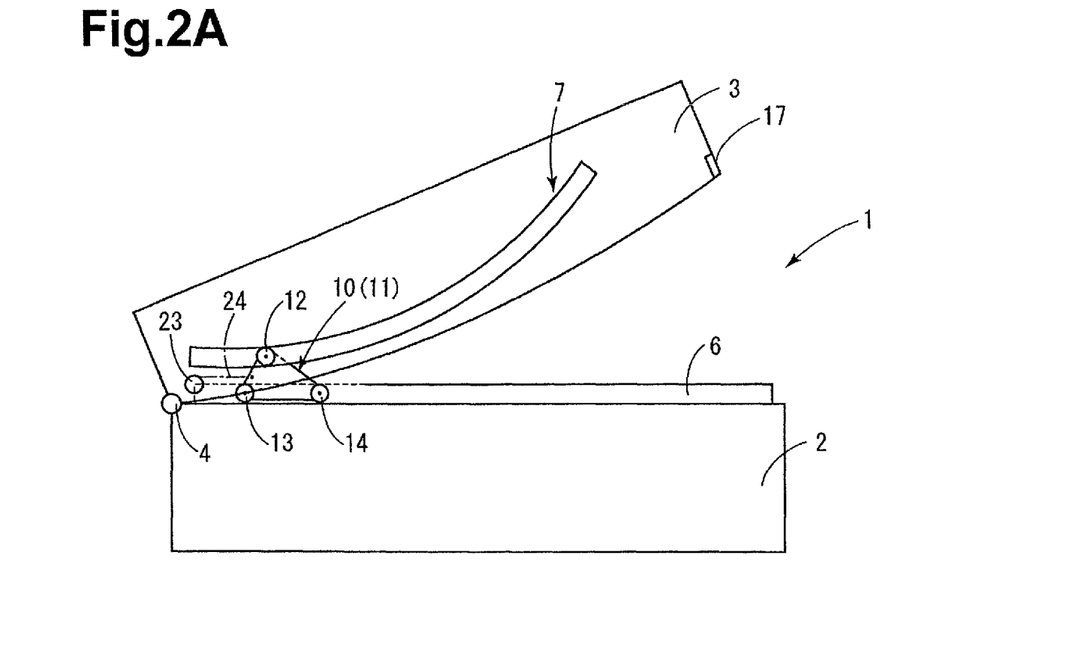
FIG. 2A is a schematic side view illustrating a state of an intermediate stage in opening the upper unit case with respect to the lower unit case of the first embodiment.
Figure 2B:
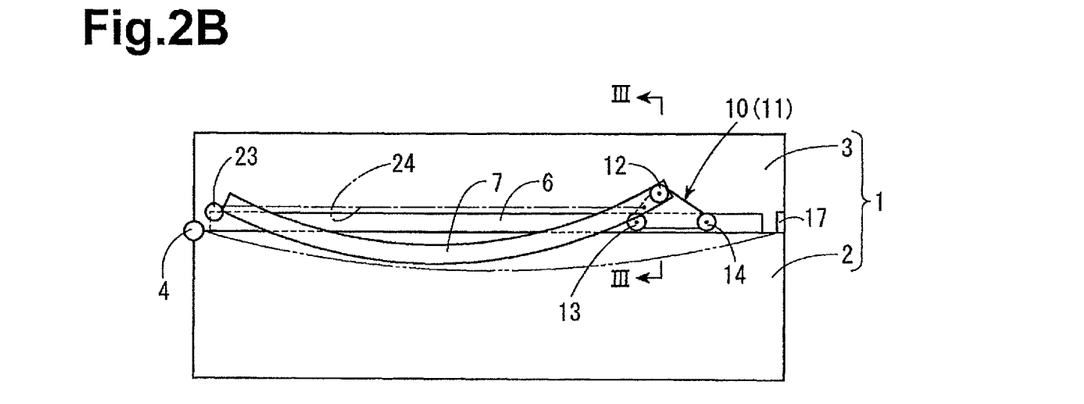
FIG. 2B is a schematic side view of a state in which the upper unit case is closed.

An image recording apparatus 1 according to the first embodiment of the present invention is a multi-function device (MFD) equipped with printing, copying, scanning, and facsimiling functions. As illustrated in FIGS. 1 and 2, an upper unit case 3 is perpendicularly swingably connected with hinges 4 to a side of a plastic lower unit case 2 of the image recording apparatus 1.

The lower unit case 2 has the following structure, which is not shown. That is, a recording portion using an inkjet method or the like is disposed above a sheet feeding cassette. A sheet of paper (recording medium) supplied from the sheet feeding cassette is transported to the recording portion through a U-shaped transport guide which is detachably attached to a rear side, a printed sheet is ejected from an opening which is formed above the sheet feeding cassette on a side of the lower unit case 2. The sheet feeding cassette is insertable through an opening.

The upper unit case 3 includes an automatic document feeding unit and an image scanning unit for purposes such as reading an original document in copying or in facsimiling (not shown). The upper unit case 3 also includes a glass plate for supporting the original document, a document cover that covers the upper side of the original document, and an operation panel where a variety of operation buttons, a liquid crystal display and so forth are arranged (not shown).

Next, an opening and closing apparatus, which allows the lower unit case 2 and the upper unit case 3 to be opened and to be closed, will be described. The lower unit case 2 and the upper unit case 3 are respectively provided with a lower guide member 6 and an upper guide member 7, both of which extend from the hinge 4 side to an open end side. An opening/closing linking unit 10 is disposed in connection with the lower guide member 6 and the upper guide member 7. The opening/closing linking unit 10 is structured such that a first rotating member 12, which is movable along the upper guide member 7, and second and third rotating members 13 and 14, which are movable along the lower guide member 6, are rotatably mounted on a frame 11 (an example of a linking portion) having a certain shape such as a triangular shape in side view. Each of the first to third rotating members 12 to 14 is formed so as to have a roller-like shape.

In the first embodiment, the first rotating member 12 is disposed at a front side of an upper vertex of the frame 11 having a triangular shape in side view. The second rotating member 13 and the third rotating member 14 are disposed at a back side of the lower vertices (lower corners) of the frame 11.

While an opening operation being performed by a user progresses, in which the upper unit case 3 is opened with respect to the lower unit case 2, the opening/closing linking unit 10 gradually moves closer to the hinge 4 side from the open end side along the lower guide member 6 and the upper guide member 7. While a closing operation progresses, in which the upper unit case 3 is closed with respect to the lower unit case 2, the opening/closing linking unit 10 gradually moves closer to the open end side from the hinge 4 side along the lower guide member 6 and the upper guide member 7.

In the first embodiment, the lower guide member 6 substantially horizontally and substantially linearly extends from the hinge 4 side toward the open end side. The upper guide member 7 extends in a downwardly convex curve from the hinge 4 side toward the open end side (refer to FIGS. 1A, 1B, 2A and 2B).

Both of the lower guide member 6 and the upper guide member 7 have U-shaped cross sections that allow the first rotating member 12, the second rotating member 13, and the third rotating member 14 to roll in and along guide grooves 15 and 16 of the lower guide member 6 and the upper guide member 7. The lower guide member 6 is disposed on an upper surface 2a of the lower unit case 2. The guide groove 15 is formed so as to be open toward a side outer surface of the lower unit case 2. The upper guide member 7 is disposed on an inner surface of a side plate 3a of the upper unit case 3 such that the guide groove 16 is inwardly open (refer to FIG. 3). When the upper unit case 3 is closed with respect to the lower unit case 2, the side plate 3a and the upper guide member 7 are positioned outside a side plate 2b of the lower unit case 2 so as to prevent interference of a middle portion of the downwardly convex upper guide member 7 with the lower unit case 2 (refer to FIG. 3). The upper unit case 3 includes a contact block 17. The contact block 17 is brought into contact with a contact portion of the upper surface 2a of the lower unit case 2 in order to determine a closed position of the upper unit case 3 and to prevent further descending of the upper unit case 3. In such a case, part of a lower end edge 3a0 of the side plate 3a overlaps the side plate 2b of the lower unit case 2 in a projection view (refer to the state represented by the chain double-dashed line FIG. 2B).

Figure 3:
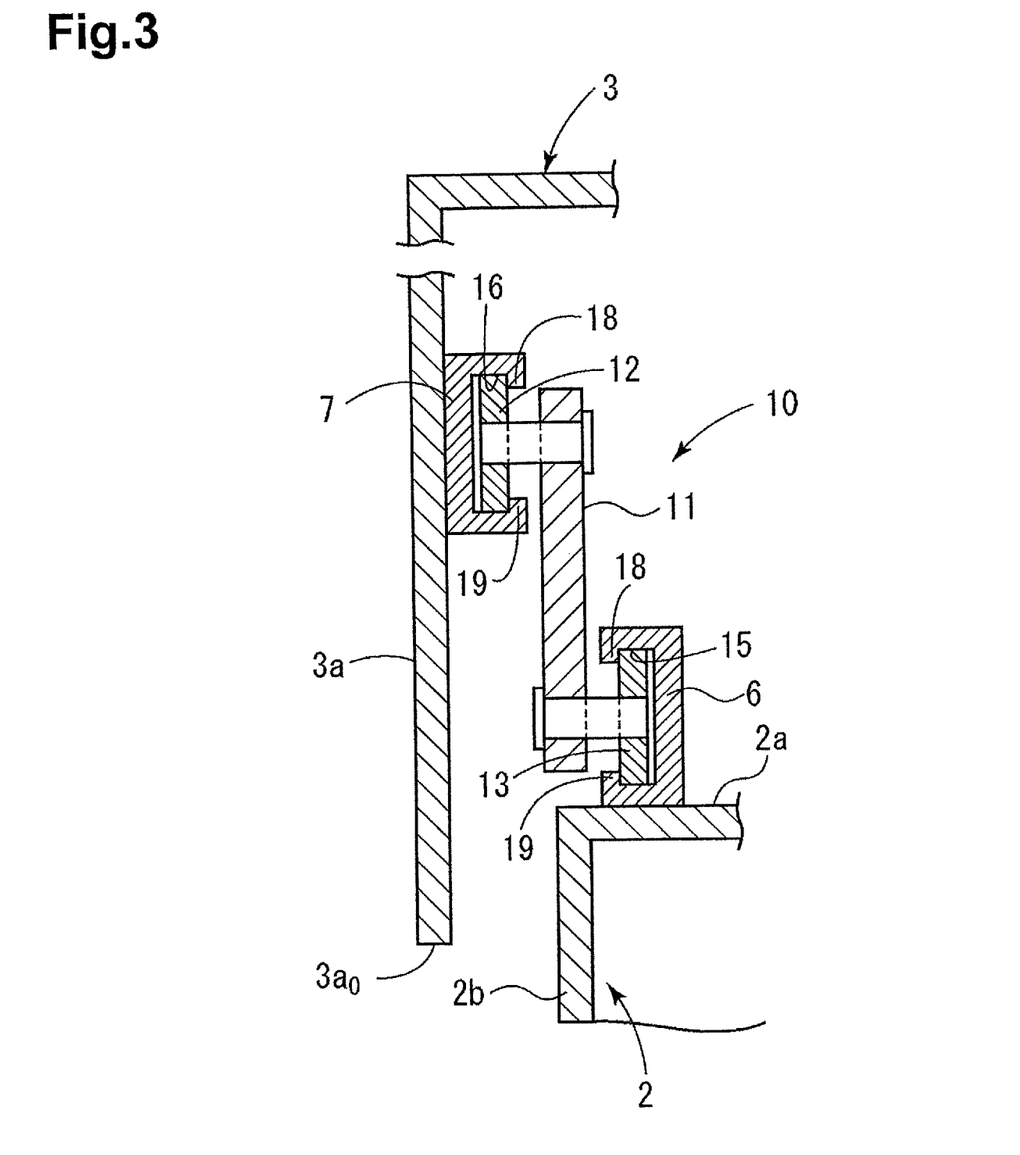
FIG. 3 is an enlarged sectional view taken along line in FIG. 2B.

In addition, to prevent the first rotating member 12 from rolling out of the guide groove 16 of the upper guide member 7 in its central axis direction, and to prevent the second rotating member 13 and the third rotating member 14 from rolling out of the guide groove 15 of the lower guide member 6 in their central axis directions, each of the guide groove 15 and the guide groove 16 is formed so as to include upper and lower guards 18 and 19 as protrusions in an integrated manner for surrounding an outer peripheral portion of each rotating member (refer to FIG. 3).

Figure 4A:
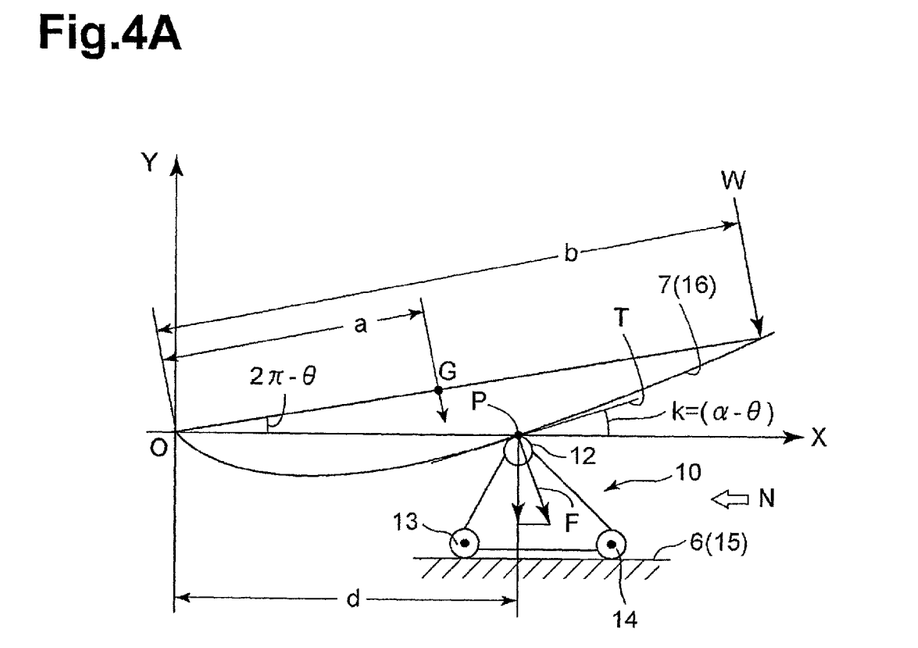
FIGS. 4A and 4B are explanatory drawings illustrating an operation of the first embodiment.
Figure 4B:
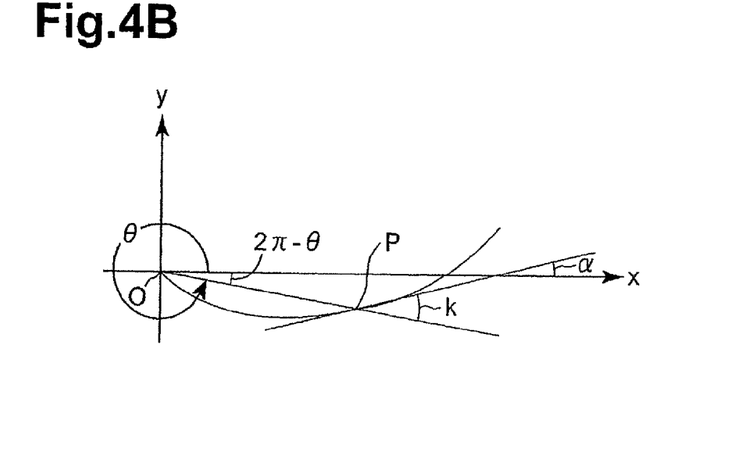

Next, an operation of the opening/closing linking unit 10 in the opening and closing apparatus will be described. It is assumed, as illustrated in FIG. 4A, that the weight mg of the upper unit case 3 (perpendicular direction) acts on the barycenter G (a position away from the position of the hinges 4 (the origin O) by the distance a), and the user manually pushes down on the upper unit case 3 with a load W at a certain position on the upper unit case 3, for example, a position at a free end side and away from the origin O by the distance b. It is also assumed that an angle formed between the x-axis and a line extending from the origin O through the barycenter G and the load W is given by $2\pi-\theta$.

In addition, it is assumed that the upper unit case 3 is supported by the first rotating member 12 of the opening/closing linking unit 10, and a position where the first rotating member 12 contacts an upper guide surface of the guide groove 16 of the upper guide member 7 (contact point) is away from the origin O by the distance d in the x-direction. It is assumed that the second rotating member 13 and the third rotating member 14 of the opening/closing linking unit 10 are movable along a lower guide surface of the guide groove 15 of the lower guide member 6 that is parallel with the x-axis, and in this case, the contact point P is positioned on the x-axis. If an angle formed by the x-axis and a tangent line T that is tangent to an upper slide surface of the guide groove 16 of the upper guide member 7 at the contact point P is k, k is given by $k=\alpha-\theta$. In addition, if the contact point is not on the x-axis (refer to FIG. 4B), the relationship among the angles k, $\alpha$, and, $\theta$ is given by $k=2\pi-\theta=\alpha-\theta$.

When the upper guide member 7 is formed so as to have a downwardly convex shape, it is clear that the contact point P is positioned on a side that is closer to the hinges 4 than the central axis of the first rotating member 12 is.

If a reaction force at the contact point P is F, the equilibrium equation of a moment about the hinges 4 (origin O) is given as follows (* denotes multiplication).

$$a*mg*\cos(2\pi-\theta)+W*b=d*F*\cos k$$

Since $\cos(2\pi-\theta)=\cos\theta$, F is given by equation (1) below.

$$F=[a*mg*\cos\theta+W*b]/[d*\cos k] \quad (1)$$

If a force in a positive direction in the x-axis at the contact point P is S, S is given by the equation below.

$S=$(x-direction component due to weight of upper unit case 3 and load $W$)-(x-direction component of frictional force at upper guide member 7 position due to weight of upper unit case 3 and load $W$)-(x-direction component of load acting on opening/closing linking unit 10)

Here, let N denote (x-direction component of load acting on opening/closing linking unit 10) and $\mu$ denote a coefficient of a static friction between the upper guide member 7 and the first rotating member 12.

Then, S is given by equation (2) below.

$$S=(F*\sin k)-(\mu*F*\cos k)-N \quad (2)$$

A load N that acts on the opening/closing linking unit 10 is caused by, for example, a frictional force and a brake force generated when the opening/closing linking unit 10 moves along the lower guide member 6 of the lower unit case 2, or a contact friction force generated between the first rotating member 12 and the side surface of the upper guide member 7 and between the second and third rotating members 13 and 14 and the side surface of the lower guide member 6, and a brake mechanism that stops the rotation of the first to third rotating members 12, 13, and 14.

In the present embodiment, the opening/closing linking unit 10 is given an urging force toward the hinges 4 by using urging mechanism having the following structure. That is, the urging mechanism includes a tubular case 23, inside of which a fixing end of a spiral spring is secured, and a string 24 (an example of an urging member), which is formed of a flexible material such as a wire and a fixing end thereof is connected to a free end of the spiral spring. A force in a wind-up direction is applied to the spiral spring in advance and the urging mechanism is set to urge most of the string 24 to be wound up inside the case 23. The case 23 is secured inside the lower unit case 2 on a side close to the hinges 4, and the free end of the string 24 is connected to the frame 11 of the opening/closing linking unit 10 (refer to FIGS. 2A and 2B). Alternatively, the opening/closing linking unit 10 may be given an urging force toward the hinges 4 with the following structure. That is, a telescopic hydraulic or gas cylinder may be secured inside the lower unit case 2 and the top end of the piston rod may be connected to the frame 11.

By substituting equation (1) into equation (2), S is given by equation (3) as follows.

$$S=[b*(\sin k-\mu*\cos k)/(d*\cos k)]W+[a*mg*\cos \theta* (\sin k-\mu*\cos k)]/(d*\cos k)-N \quad (3)$$

Here, suppose that $U=[b*(\sin k-\mu*\cos k)/(d*\cos k)]$, and V can be given by the following equation.

$$V=a*mg*\cos \theta*U/b$$

Since U and V are constants that are determined when the weight of the upper unit case 3 and the position of the first rotating member 12 are determined, the function S is a linear function of W.

That is, the function of equation (3), S(W), is given by equation (4) below.

$$S(w)=U*W+(V-N) \quad (4)$$

Figure 5:
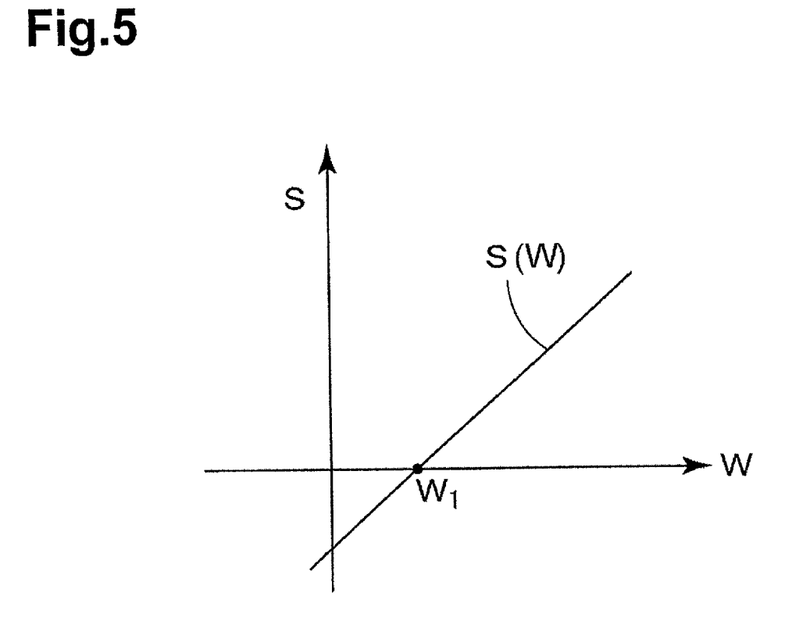
FIG. 5 is a graph for explaining the operation.

Referring to a graph in FIG. 5, the horizontal axis represents W and the vertical axis represents S. By studying a condition under which the opening/closing linking unit 10 in a certain position starts to move in the closing direction (S≥0) by applying W (W≥0), it has been found that U needs to be a positive value and the following condition needs to be satisfied. That is, w1=(V−N)≥0. If U is negative, V also becomes negative. In such a case, the upper unit case 3 is firmly closed and does not move. If U is positive and w1 is negative, a force in a positive direction is constantly applied to the opening/closing linking unit 10 (moving member). Therefore, the upper unit case 3 cannot be held at a position without a manual support.

As described above, in the present embodiment, the upper guide member 7 is formed so as to have a downwardly convex shape, the lower guide member 6 is formed so as to have a linear shape and horizontal orientation, and the opening/closing linking unit 10 is movable therebetween. Thus, when the user applies a downward pressing force W at a certain position of the upper unit case 3, the opening/closing linking unit 10 moves in the closing direction (direction moving away from the hinges 4). In contrast, when the user does not apply the above-described pressing force (that is, does not push down), the opening/closing linking unit 10 can be stopped at a certain position. This can eliminate a related art situation in which a rotation speed of the upper unit case 3 in the closing direction is suddenly increased in the last stage of closing of the upper unit case 3 with respect to the lower unit case 2, and the upper unit case 3 hits the lower unit case 2, thereby generating a loud noise. Problems related to such an impact such as sliding of components inside the body of the above-described apparatus and damage to members on hit surfaces can also be reduced.

In addition, by adjusting the strength of the pressing force W applied by the user, an effect of decreasing a bouncing movement of the upper unit case 3 that is closed by being moved toward the closed position is achieved.

The opening/closing linking unit 10 includes the triangular frame 11, and the first rotating member 12 is disposed near the upper vertex of the triangle of the frame 11. A force received by the first rotating member 12 at the contact point P, where the first rotating member 12 contacts the upper guide member 7, is directed toward a position between the second rotating member 13 and the third rotating member 14 disposed near the vertices of the base of the triangle of the frame 11. This facilitates a stable movement of the opening/closing linking unit 10 along both the lower guide member 6 and the upper guide member 7 with the posture of the opening/closing linking unit 10 maintained.

By setting the downwardly convex curve of the upper guide member 7 to a predetermined shape, the downward pressing force W by the user can be a constant force regardless of the opening angle of the upper unit case 3.

According to the present invention, to open the upper unit case 3 with respect to the lower unit case 2, the user applies an upward force at a position such as the free end of the upper unit case 3 so as to cause the opening/closing linking unit 10 to move closer to the hinges 4 along the lower guide member 6 and the upper guide member 7. When application of the above-described upward force is stopped, the movement of the opening/closing linking unit 10 stops at a position where the opening/closing linking unit 10 rests when the application of the force is stopped. Thus, the opening angle of the upper unit case 3 can be maintained.

Figure 6:
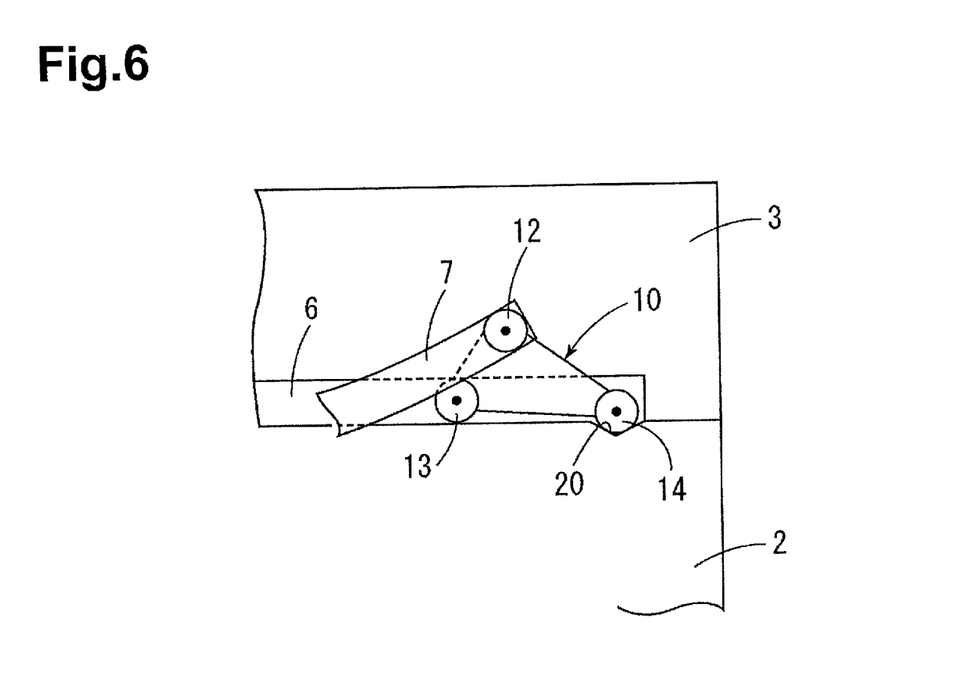
FIG. 6 is a schematic side view illustrating an example where an opening/closing linking unit is stopped when the upper unit case is closed.

FIG. 6 illustrates a recess 20 that is provided in a position away from the hinges 4 in the lower guide surface of the lower guide member 6. The third rotating member 14 moves downward and is fitted into the recess 20 at a position where the opening/closing linking unit 10 rests when the upper unit case 3 is closed with respect to the lower unit case 2. Due to the fitting of the third rotating member 14 into the recess 20, the first rotating member 12 and the third rotating member 14 move downward about the second rotating member 13 as the center of the movement. Thus, a load in a negative direction along the x-axis that is applied to the opening/closing linking unit 10 at the final stage of the closing can be decreased and complete closure can be achieved.

Figure 7A:
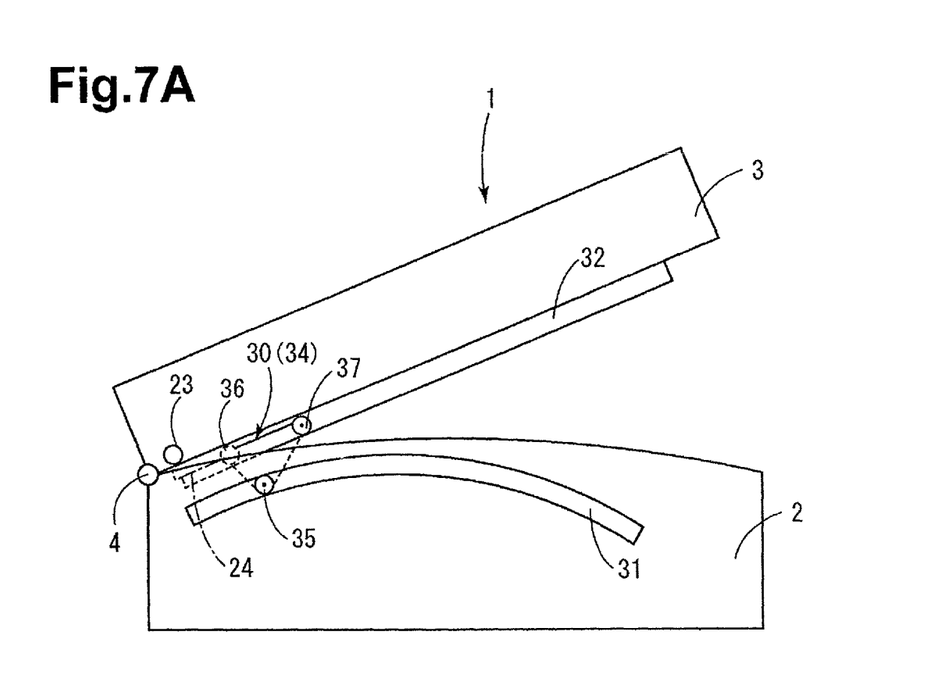
FIG. 7A is a schematic side view illustrating a state of an intermediate stage in opening an upper unit case with respect to a lower unit case of a second embodiment.
Figure 7B:
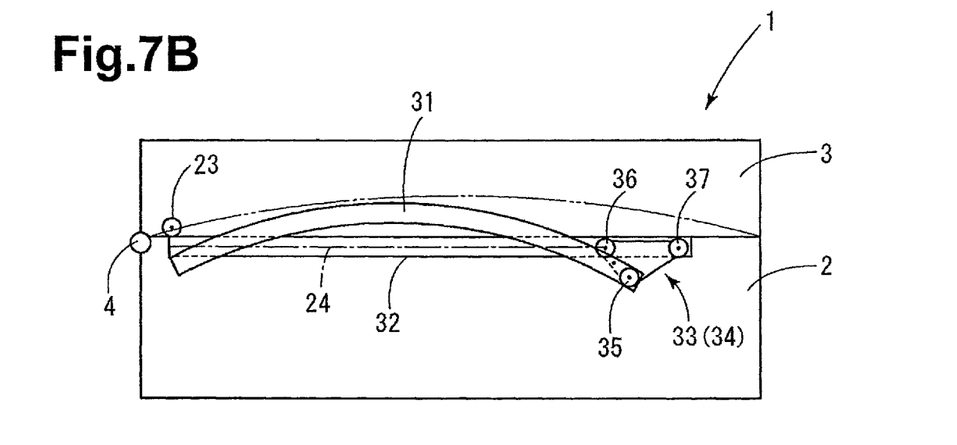
FIG. 7B is a perspective view illustrating a state in which the upper unit case is closed.

FIGS. 7A and 7B illustrate a second embodiment. A lower guide member 31 having an upwardly convex shape is disposed in the lower unit case 2 so as to extend from the hinge 4 side toward the open end side. An upper guide member 32, which is formed so as to have a linear shape and a horizontal orientation when the upper unit case 3 is closed, is disposed in the upper unit case 3 so as to extend from the hinge 4 side toward the open end side. An opening/closing linking unit 33 is provided with a frame 34 having a downwardly oriented triangular shape. A first rotating member 35 is rotatably attached to the lower end of the frame 34, and a second rotating member 36 and a third rotating member 37 are rotatably attached to the upper side of the frame 34. While an opening operation being performed by the user progresses, in which the upper unit case 3 is opened with respect to the lower unit case 2, the opening/closing linking unit 33 gradually moves closer to the hinge 4 side from the open end side along the lower guide member 31 and the upper guide member 32. While a closing operation progresses, in which the upper unit case 3 is closed with respect to the lower unit case 2, the opening/closing linking unit 33 gradually moves closer to the open end side from the hinge 4 side along the lower guide member 31 and the upper guide member 32. In this closing operation, the first rotating member 35 contacts and rolls along the lower surface of a guide groove of the lower guide member 31, and the second rotating member 36 and the third rotating member 37 contact and roll along the upper surface of the rail groove of the upper guide member 32. The structures of the first, second, and third rotating members 35, 36, and 37, and both of the lower and upper guide members 31 and 32 are the same as those in the first embodiment. When the upper unit case 3 has been closed with respect to the lower unit case 2, the lower guide member 31 partially overlaps the upper guide member 32 in a height direction of the unit cases in a projected view in a direction perpendicular to a direction in which both of the guide members extend. In addition, the case 23 provided with the string 24 is secured to the upper unit case 3 on a side close to the hinges 4, and the free end of the string 24 is connected to the frame 34 in order to apply a load directed toward the hinges 4 on the opening/closing linking unit 33.

Figure 8:
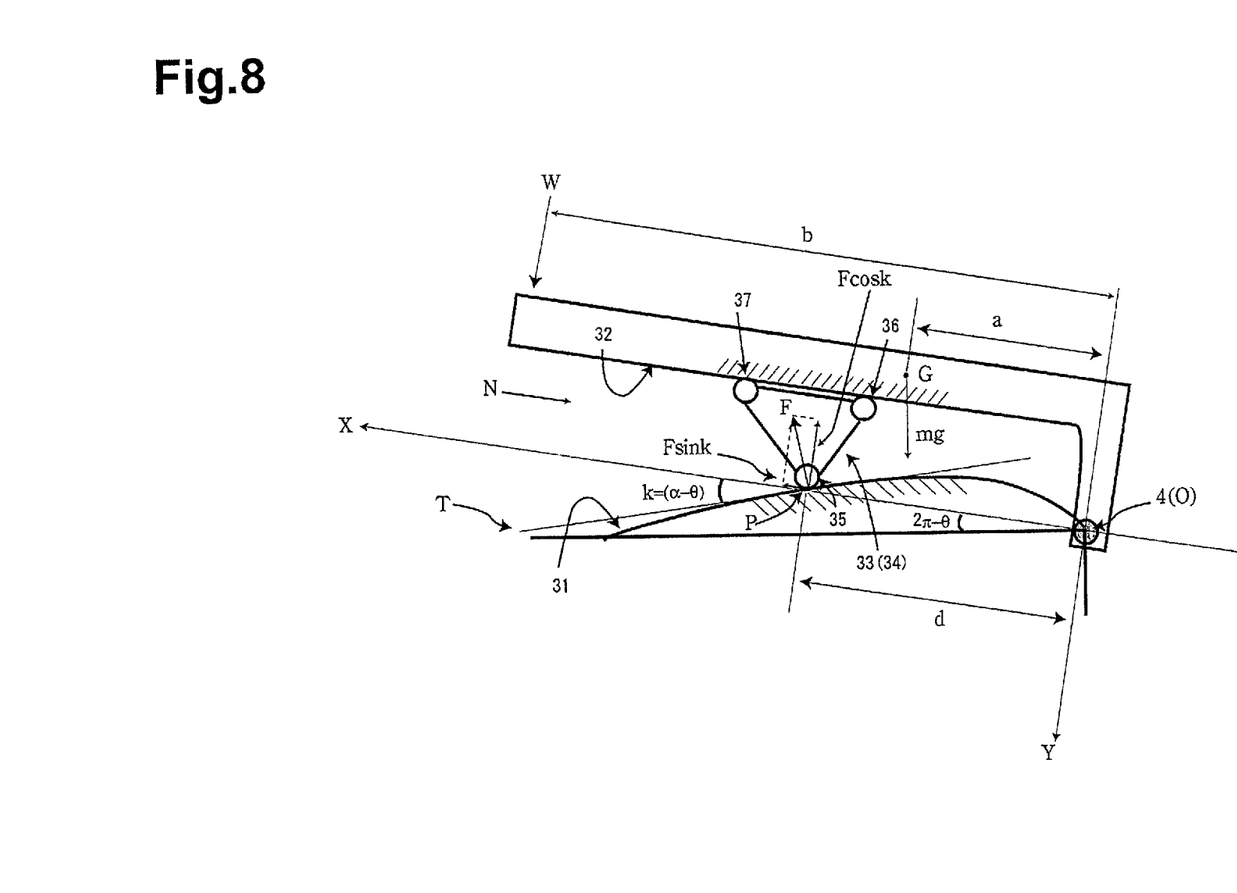
FIG. 8 is an explanatory drawing illustrating an operation of the second embodiment.

With the above-described structure, it is assumed that, as illustrated in FIG. 8, the weight mg of the upper unit case 3 (perpendicular direction) acts on the barycenter and in a closing operation, the user pushes down at a certain position on the upper unit case 3 such as a position on the side of the free end with a force of the load W.

It is also assumed that the second and third rotating members 36 and 37 of the opening/closing linking unit 33 support loads applied by the upper unit case 3, and these loads are supported only by the first rotating member 35. It is also assumed that the contact point P, where the first rotating member 35 contacts the lower guide surface of the guide groove of the lower guide member 31 having an upwardly convex shape, is separated from the origin O by a predetermined distance in the x-direction. It is assumed that the second and third rotating members 36 and 37 of the opening/closing linking unit 33 are movable along the upper guide member 32 that is parallel with the x-axis. In this case, it is assumed that the contact point P is positioned on the x-axis. It is assumed that an angle formed by the x-axis and a tangent line T that is tangent to the lower guide member 31 at the contact point P is k.

If a force in a positive direction in the x-axis at the contact point P is S, S is given by the equation below.

$S$=(x-direction component of weight of upper unit case 3 and load $W$)−(x-direction component of frictional force at lower guide member 31 position caused by weight of upper unit case 3 and load $W$)−(x-direction component of load acting on opening/closing linking unit 33)

Here, (x-direction component of load acting on opening/closing linking unit 33) is assumed to be N, and a coefficient of static friction between the lower guide member 31 and the first rotating member 35 is assumed to be μ.

Then, S is given by following equation.

$S=(F^{*}\sin k)-(\mu^{*}F^{*}\cos k)-N$

Since this equation is the same as equation (2) in the first embodiment, the same operational effect as the first embodiment can be achieved with the structure of the second embodiment.

In addition to the above-described embodiments, the present invention may be implemented in a variety of embodiments without departing from the gist thereof. That is, the upper and lower guide members, when formed so as to have a linear shape, need not have horizontal orientation when the upper unit case is closed. The upper and lower guide members extending toward the open end side may be upwardly or downwardly inclined. The upper and lower unit cases can be used as bodies and covers of electrical appliances, furniture, and fixtures as well as the image recording apparatuses.

What is claimed is:

1. An opening and closing apparatus comprising:
   a lower unit case;
   an upper unit case disposed above the lower unit case and configured to open and close with respect to the lower unit case;
   a hinge configured to connect the upper unit case to the lower unit case such that the upper unit case pivots with respect to the lower unit case;
   a lower guide member disposed in the lower unit case and extending from a base end side toward a distal end side of the lower unit case;
   an upper guide member disposed in the upper unit case and extending from a base end side toward a distal end side of the upper unit case; and
   an opening/closing linking unit comprising a first rotating member, a second rotating member and a linking portion, the linking portion being configured to link the first rotating member and the second rotating member,
   wherein as the upper unit case is opened with respect to the lower unit case, the opening/closing linking unit moves from the distal end side toward the base end side along the upper guide member and the lower guide member, and as the upper unit case is closed with respect to the lower unit case, the opening/closing linking unit moves from the base end side toward the distal end side along the upper guide member and the lower guide member.

2. The opening and closing apparatus according to claim 1, wherein the lower guide member has a linear shape and the upper guide member has a downwardly convex shape, and
   wherein the opening/closing linking unit further comprises a third rotating member, the first rotating member is movable along the upper guide member, and the second rotating member and the third rotating member are movable along the lower guide member.

3. The opening and closing apparatus according to claim 2, wherein the opening/closing linking unit further comprises:
   a first shaft configured to rotatably support the first rotating member;
   a second shaft configured to rotatably support the second rotating member; and
   a third shaft configured to rotatably support the third rotating member;
   wherein the linking portion comprises a frame connected to the first shaft, the second shaft and the third shaft.

4. The opening and closing apparatus according to claim 2, wherein a direction of a force received by the first rotating member at a contact point where the first rotating member contacts the upper guide member is configured to pass through a line connecting an axial center of the second rotating member and an axial center of the third rotating member.

5. The opening and closing apparatus according to claim 2, wherein the lower guide member includes a recess portion having a recess,
   wherein the third rotating member is further from the hinge than the second rotating member is, and
   wherein, when the upper unit case is closed with respect to the lower unit case, the third rotating member is configured to be fitted into the recess.

6. The opening and closing apparatus according to claim 1, wherein the upper guide member has a linear shape and the lower guide member has an upwardly convex shape, and
   wherein the opening/closing linking unit further comprises a third rotating member, the first rotating member is movable along the lower guide member, and the second rotating member and the third rotating member are movable along the upper guide member.

7. The opening and closing apparatus according to claim 6, wherein the opening/closing linking unit further comprises:
   a first shaft configured to rotatably support the first rotating member;
   a second shaft configured to rotatably support the second rotating member; and
   a third shaft configured to rotatably support the third rotating member;
   wherein the linking portion comprises a frame connected to the first shaft, the second shaft and the third shaft.

8. The opening and closing apparatus according to claim 1, wherein the upper guide member is formed such that a position where the first rotating member contacts the upper guide member is closer to the hinge than the axial center of the first rotating member is.

9. The opening and closing apparatus according to claim 1, wherein the lower guide member is formed such that a position where the first rotating member contacts the lower guide member is closer to the hinge than the axial center of the first rotating member is.

10. The opening and closing apparatus according to claim 1, wherein at least one of the upper guide member and the lower guide member is formed with a guard that restricts corresponding one of the first rotating member and the second rotating member from moving out in a central axial direction thereof.

11. The opening and closing apparatus according to claim 1, wherein, when the upper unit case is closed with respect to the lower unit case, the lower guide member partially overlaps the upper guide member from a lateral view.

12. The opening and closing apparatus according to claim 1, wherein each of the upper guide member and the lower guide member has a guide groove having a U shape in a cross section, and
   wherein the guide groove of the lower guide member is open toward a side outer surface of the lower unit case, and the guide groove of the upper guide member is open toward a side inner surface of the upper unit case.

13. The opening and closing apparatus according to claim 1, further comprising an urging member configured to connect the hinge to the opening/closing linking unit and to give the opening/closing linking unit an urging force toward the hinge.

* * * * *